United States Patent
Wang

(10) Patent No.: US 11,259,353 B2
(45) Date of Patent: Feb. 22, 2022

(54) BEARER CONFIGURATION METHOD AND APPARATUS, AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/926,895

(22) Filed: Jul. 13, 2020

(65) Prior Publication Data

US 2020/0344830 A1 Oct. 29, 2020

Related U.S. Application Data

(63) Continuation of application No. PCT/CN2019/074987, filed on Feb. 13, 2019.

(51) Int. Cl.
*H04W 76/15* (2018.01)
*H04W 72/12* (2009.01)
*H04W 76/11* (2018.01)
*H04W 84/18* (2009.01)

(52) U.S. Cl.
CPC ....... *H04W 76/15* (2018.02); *H04W 72/1263* (2013.01); *H04W 76/11* (2018.02); *H04W 84/18* (2013.01)

(58) Field of Classification Search
CPC ...................... H04W 28/0257; H04W 28/0263
See application file for complete search history.

(56) References Cited

U.S. PATENT DOCUMENTS

| 2015/0351139 | A1* | 12/2015 | Zhang | H04W 88/06 370/329 |
| --- | --- | --- | --- | --- |
| 2019/0037625 | A1* | 1/2019 | Shih | H04W 48/16 |
| 2019/0166646 | A1* | 5/2019 | Shih | H04W 72/04 |
| 2020/0128433 | A1* | 4/2020 | Jeong | H04M 15/66 |
| 2020/0178208 | A1* | 6/2020 | Kim | H04W 68/02 |

FOREIGN PATENT DOCUMENTS

| CN | 105917702 A | 8/2016 |
| --- | --- | --- |
| CN | 108633018 A | 10/2018 |
| CN | 109246757 A | 1/2019 |
| CN | 109246844 A | 1/2019 |

(Continued)

OTHER PUBLICATIONS

International Application No. PCT/CN2019/074987, International search report, dated Nov. 13, 2019, 10 pages.

(Continued)

*Primary Examiner* — Ruihua Zhang
(74) *Attorney, Agent, or Firm* — Perkins Coie LLP

(57) ABSTRACT

Embodiments of this application provide a bearer configuration method in a dual connectivity network and associated apparatus, and a network device. The method includes: receiving, by a first node, a first request message sent by a second node, the first request message carrying first indication information, and the first indication information is for deciding, by the first node, whether to configure a default bearer. The first node is a secondary node, and the second node is a master node.

25 Claims, 4 Drawing Sheets

(56) References Cited

FOREIGN PATENT DOCUMENTS

WO   WO2016182580 A1   11/2016
WO      2018202153 A1   11/2018

OTHER PUBLICATIONS

3GPP TS 38.300V15.4.0 (Dec. 2018) MR-DC TS.
3GPP TS 37.340 V15.4.0 (Dec. 2018) NR stage 2 TS.
CATT: "Bearer type negotiation for MR-DC with 5GC", 3GPP Draft; R2-1816275, vol. RAN WG2, No. Spokane, USA; Nov. 12, 2018 (Nov. 12, 2018), XP051555872.
EPO, Extended European Search Report for European Patent Application No. 19912186.4. dated Mar. 15, 2021. 11 pages.
Ericsson: "Resource allocation for SN-terminated bearers", 3GPP Draft; R3-185947; vol. RAN WG3, No. Chengdu, P. R. China; Sep. 29, 2018 (Sep. 29, 2018), XP051529215.
Huawei: "(TP for BL CR for TS 38.423): Correction on DL UP TNL information in MN initiated procedures", 3GPP Draft; R3-185769, vol. RAN WG3, No. Chengdu, China; Sep. 29, 2018 (Sep. 29, 2018), XP051529038.
Samsung: "(TP for BL CR for TS 37.340): POU Session Split in MR-DC", 3GPP Draft; R3-186578 vol. RAN WG3, No. Spokane, WA, USA; Nov. 11, 2018 (Nov. 18, 2018), XP051558352.
ZTE: "(TP for BL CR for TS 38.423): Consideration on pre-allocation method on DL TNL address allocation at SN", 3GPP Draft; R3-186362; vol. RAN WG3, No. Spokane, USA; Nov. 11, 2018 (Nov. 11, 2018), XP051567751.
First Office Action of the Canadian application No. 3093028, dated Sep. 13, 2021. 3 pages.
Office Action of the Indian application No. 202027046656, dated Dec. 7, 2021. 7 pages with English translation.
First Office Action of the European application No. 19912186.4, dated Jan. 4, 2022. 5 pages.

\* cited by examiner

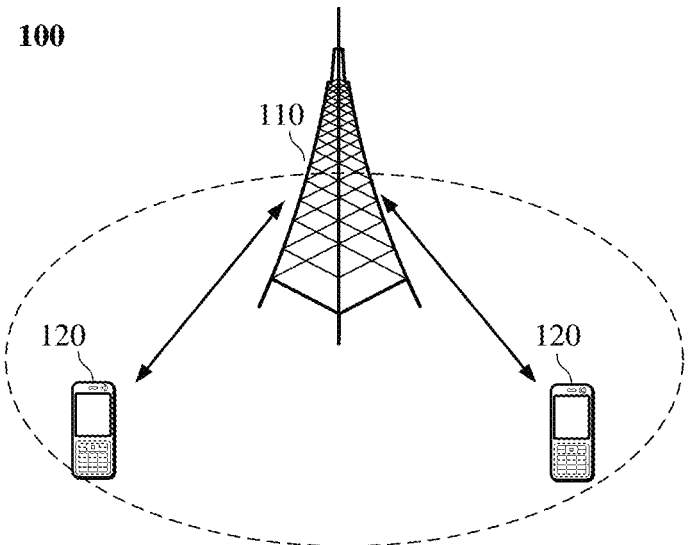

FIG. 1

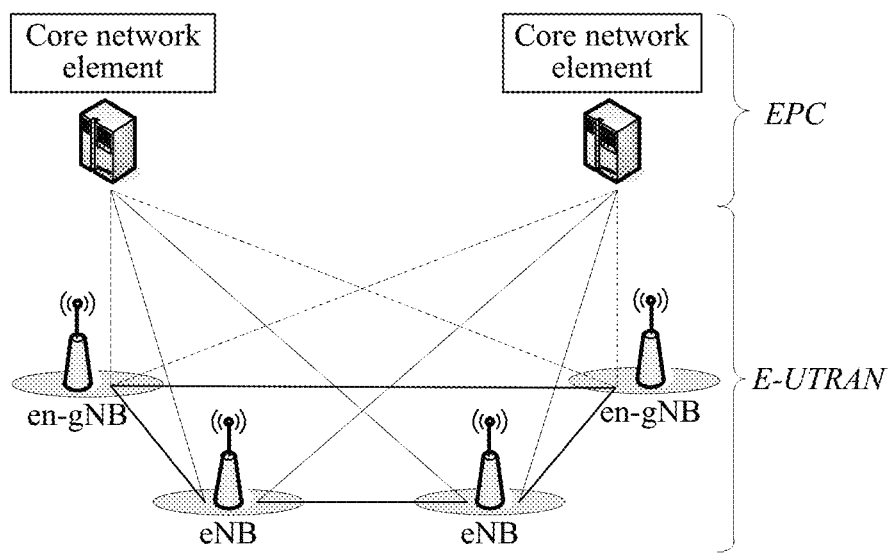

FIG. 2

A first node receives a first request message sent by a second node, the first request message carrying first indication information, and the first indication information being used for deciding, by the first node, whether to configure a default bearer, where the first node and the second node are a secondary node and a master node in a dual connectivity network respectively

A second node sends a first request message to a first node, the first request message carrying first indication information, and the first indication information being used for deciding, by the first node, whether to configure a default bearer, where the first node and the second node are a secondary node and a master node in a dual connectivity network respectively ⟵ 401

FIG. 4

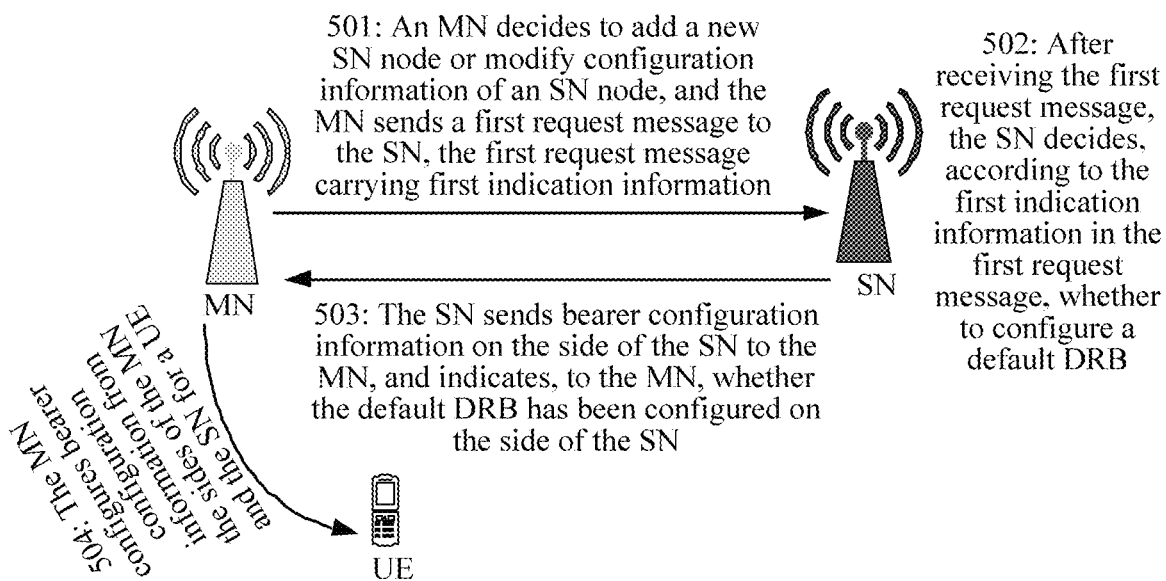

FIG. 5

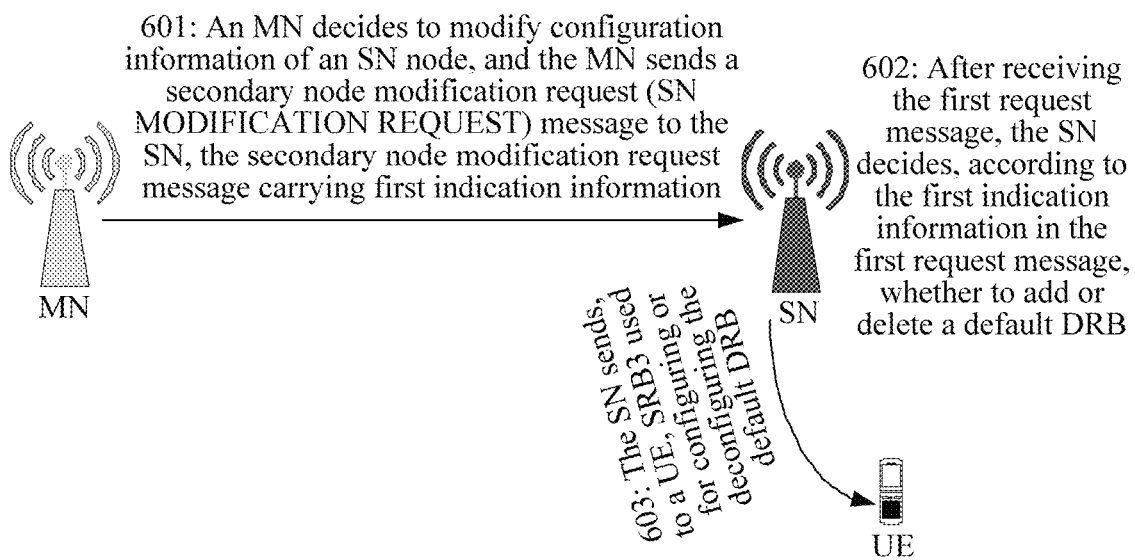

FIG. 6

BEARER CONFIGURATION METHOD AND APPARATUS, AND NETWORK DEVICE

CROSS-REFERENCE TO RELATED APPLICATIONS

This application is a continuation of PCT Application No. PCT/CN2019/074987, filed on Feb. 13, 2019, the disclosure of which is hereby incorporated by reference in its entirety.

TECHNICAL FIELD

Embodiments of this application relate to the field of mobile communications technologies, and specifically to a bearer configuration method and apparatus, and a network device.

BACKGROUND

In multi radio access technology-dual connectivity (MR-DC), quality of service flows (Qos flows) belonging to the same packet data unit (PDU) session may be respectively mapped to data radio bearers (DRBs) in a master node (MN) and a secondary node (SN). In another aspect, the protocol specifies that at most one default DRB can be configured for one PDU session. If a node does not have a default DRB, a Qos flow may not find a corresponding bearer for mapping during the mapping process, and how to ensure the validity of bearer configuration is a problem to be resolved.

SUMMARY

Embodiments of this application provide a bearer configuration method and apparatus, and a terminal.

An embodiment of this application provides a bearer configuration method, including:

receiving, by a first node, a first request message sent by a second node, the first request message carrying first indication information, and the first indication information being used for deciding, by the first node, whether to configure a default bearer, where the first node and the second node are a secondary node and a master node in a dual connectivity network respectively.

An embodiment of this application provides a bearer configuration method, including:

sending, by a second node, a first request message to a first node, the first request message carrying first indication information, and the first indication information being used for deciding, by the first node, whether to configure a default bearer, where the first node and the second node are a secondary node and a master node in a dual connectivity network respectively.

An embodiment of this application provides a bearer configuration apparatus, applied to a first node, including:

a receiving unit, configured to receive a first request message sent by a second node, the first request message carrying first indication information, and the first indication information being used for deciding, by the first node, whether to configure a default bearer, where the first node and the second node are a secondary node and a master node in a dual connectivity network respectively.

An embodiment of this application provides a bearer configuration apparatus, applied to a second node, including:

a first sending unit, configured to send a first request message to a first node, the first request message carrying first indication information, and the first indication information being used for deciding, by the first node, whether to configure a default bearer, where the first node and the second node are a secondary node and a master node in a dual connectivity network respectively.

An embodiment of this application provides a network device, including a processor and a memory. The memory is configured to store a computer program, and the processor is configured to invoke and run the computer program stored in the memory, to perform the foregoing bearer configuration method.

An embodiment of this application provides a chip, configured to implement the foregoing bearer configuration method.

Specifically, the chip includes a processor, and the processor is configured to invoke a computer program from a memory and run the computer program, to cause a device installed with the chip installed to perform the foregoing bearer configuration method.

An embodiment of this application provides a computer-readable storage medium, configured to store a computer program, where the computer program causes a computer to perform the foregoing bearer configuration method.

An embodiment of this application provides a computer program product, including a computer program instruction, where the computer program instruction causes a computer to perform the foregoing bearer configuration method.

An embodiment of this application provides a computer program, where the computer program, when run on a computer, causes the computer to perform the foregoing bearer configuration method.

Through the above technical solutions, configuration of a default bearer is negotiated between a master node and a secondary node, thereby ensuring that each data flow can find a corresponding bearer for mapping, and ensuring data transmission.

BRIEF DESCRIPTION OF THE DRAWINGS

The accompanying drawings described herein are used to provide a further understanding of this application, and form a part of this application. Exemplary embodiments of this application and descriptions thereof are used to explain this application, and do not constitute any inappropriate limitation to this application. In the accompanying drawings:

FIG. 1 is a schematic architectural diagram of a communications system according to an embodiment of this application;

FIG. 2 is a diagram of network deployment and networking architecture of EN-DC according to an embodiment of this application;

FIG. 3 is a first schematic flowchart of a bearer configuration method according to an embodiment of this application;

FIG. 4 is a second schematic flowchart of a bearer configuration method according to an embodiment of this application;

FIG. 5 is a third schematic flowchart of a bearer configuration method according to an embodiment of this application;

FIG. 6 is a fourth schematic flowchart of a bearer configuration method according to an embodiment of this application;

DETAILED DESCRIPTION

Figure 7:
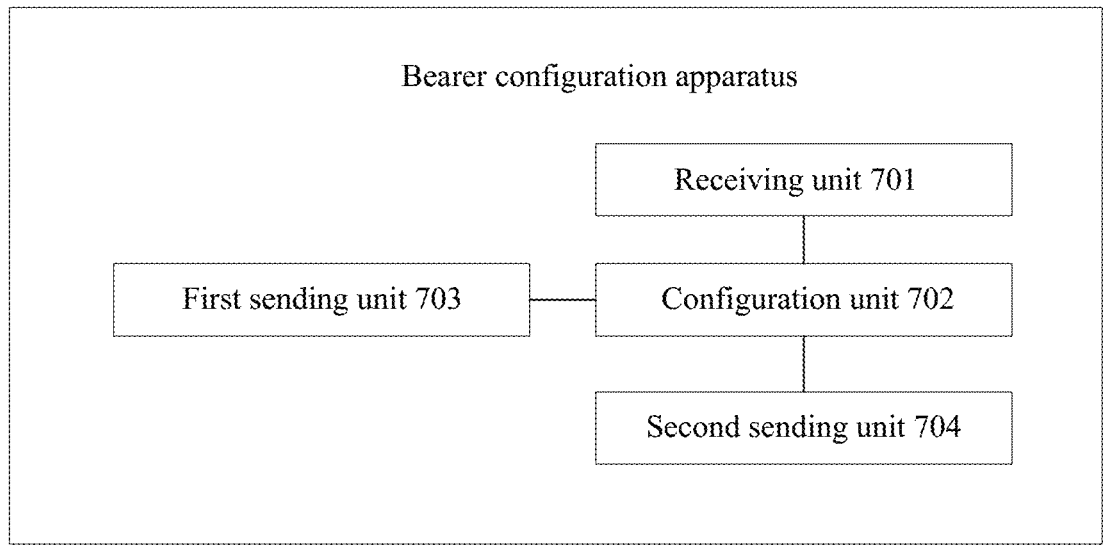
FIG. 7 is a first schematic diagram of structural composition of a bearer configuration apparatus according to an embodiment of this application.

The technical solutions of the embodiments of this application will be described in the following with reference to the accompanying drawings. It is obvious that the embodiments to be described are some rather than all of the embodiments of this application. All other embodiments obtained by persons of ordinary skill in the art based on the embodiments of this application without creative efforts shall fall within the protection scope of this application.

The technical solutions in the embodiments of this application may be applied to various communications systems, such as a Global System of Mobile communication (GSM), a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, a Universal Mobile Telecommunications System (UMTS), a Worldwide Interoperability for Microwave Access (WiMAX) communications system, or a 5G system.

For example, a communications system 100 to which an embodiment of this application is applied is shown in FIG. 1. The communications system 100 may include a network device 110, and the network device 110 may be a device communicating with a terminal (or referred to as a communications terminal) 120. The network device 110 may provide communication coverage for a particular geographical area, and may communicate with a terminal that is located in the coverage. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a network bridge, a router, a network side device in a 5G network, a network device in a future evolved public land mobile network (PLMN) or the like.

The communications system 100 further includes at least one terminal 120 located within the coverage range of the network device 110. As used herein, the "terminal" includes, but is not limited to, a device that is configured to receive/transmit communication signals via a wired connection, such as via a public switched telephone network (PSTN), a digital subscriber line (DSL), a digital cable, a direct cable connection, and/or another data connection/network, and/or via a wireless interface with, for example, a cellular network, a wireless local area network (WLAN), a digital television network such as a DVB-H network, a satellite network, an AM/FM broadcast transmitter, and/or another terminal; and/or an Internet of Things (IoT) device. A terminal configured to communicate through a wireless interface may be referred to as a "wireless communications terminal," "wireless terminal" or "mobile terminal." Examples of the mobile terminal include, but are not limited to, a satellite or a cellular telephone; a personal communications system (PCS) terminal that may combine a cellular radiotelephone with data processing, facsimile and data communication capabilities; a personal digital assistant (PDA) that can include a radiotelephone, a pager, Internet/Intranet access, a web browser, a notepad, a calendar, and/or a global positioning system (GPS) receiver; and a conventional laptop and/or palmtop receiver or another electronic device that includes a radiotelephone transceiver. The terminal may be an access terminal, user equipment (UE), a user unit, a user station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal in a 5G network, a terminal in a future evolved PLMN or the like.

Optionally, the terminal 120 may perform device to device (D2D) communication with each other.

Optionally, the 5G system or 5G network may also be referred to as a new radio (NR) system or an NR network.

FIG. 1 shows one network device and two terminals as an example. Optionally, the communications system 100 may include a plurality of network devices and coverage of each network device may include another quantity of terminals. This is not limited in this embodiment of this application.

Optionally, the communications system 100 may further include other network entities such as a network controller and a mobility management entity. This is not limited in this embodiment of this application.

It should be understood that, the device having a communication function in the network/system in this embodiment of this application may be referred to as a communications device. Taking the communications system 100 shown in FIG. 1 as an example, the communications device may include a network device 110 and a terminal 120 that have a communication function. The network device 110 and the terminal 120 may be specific devices described above, and details are not described herein again. The communications device may also include other devices in the communications system 100, for example, a network controller, a mobile management entity, and another network entity, which is not limited in this embodiment of this application.

It should be understood that, terms "system" and "network" in this specification are usually interchangeably used in this specification. The term "and/or" in this specification is merely an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

With people's pursuit for speed, low latency, high-speed mobility and energy efficiency, and the diversity and complexity of services in the future, the 3rd generation partnership project (3GPP) international standard organization began to develop 5G. The main application scenarios of 5G are: enhanced mobile broadband (eMBB), ultra-reliable low-latency communications (URLLC), and massive machine-type communications (mMTC).

On the one hand, eMBB is still aimed at allowing users to obtain multimedia content, services, and data, and its demand is growing rapidly. On the other hand, because eMBB may be deployed in different scenarios, such as indoor, urban, and rural areas, its capability and requirement vary greatly. Therefore, it cannot be generalized, and detailed analysis in conjunction with specific deployment scenarios is required. Typical applications of URLLC include: industrial automation, electric power automation, telemedicine operation (surgery), traffic safety guarantee, and the like. Typical characteristics of mMTC include: high connection density, small data volume, latency-insensitive services, low cost and long service life of modules, and the like.

In the early deployment of NR, complete NR coverage is difficult to obtain, so typical network coverage modes are wide-area LTE coverage and island coverage of NR. A large amount of LTE is deployed below 6 GHz, with little spectrum below 6 GHz available for 5G. Therefore, spectrum applications above 6 GHz needs to be researched in NR, but high-frequency bands have limited coverage and fast signal fading. At the same time, to protect mobile operators' early investment in LTE, a working mode of tight interworking between LTE and NR is proposed.

To achieve 5G network deployment and commercial applications as soon as possible, 3GPP first completed the first 5G version before the end of 2017, namely, LTE-NR Dual Connectivity (EN-DC). In EN-DC, an LTE NodeB (eNB) serves as a master node (MN), and an NR NodeB (gNB or en-gNB) serves as a secondary node (SN). Network deployment and networking architecture of EN-DC are shown in FIG. 2. An evolved universal terrestrial radio access network (E-UTRAN) represents an access network, and an evolved packet core network (EPC) represents a core network. The access network includes at least one eNB (two eNBs are shown in FIG. 2) and at least one en-gNB (two en-gNBs are shown in FIG. 2), where the eNB serves as an MN and the en-gNB serves as an SN, and both the MN and the SN are connected to the EPC.

In the later phase of R15, other DC modes will be supported, namely, NE-DC, 5GC-EN-DC, and NR DC. For EN-DC, the core network connected to the access network is an EPC, while for other DC modes, the core network connected to the access network is a 5GC.

It should be noted that, the technical solutions in the embodiments of this application may be applied to any one of the DC modes described above.

In an NR system, when a service needs to be transmitted, a PDU session is first established, and each PDU session includes a plurality of data flows, that is, Qos flows. A plurality of DRBs needs to be established to bear these data flows on an air interface. A network-side RAN will also configure a mapping relationship between Qos flows and DRBs. In addition, the network-side RAN will also configure a default DRB, so that a Qos flow that is not configured with a mapping relationship between a Qos flow and a DRB can be mapped to a DRB. The protocol specifies that at most one default DRB can be configured for a PDU session.

In MR-DC, a plurality of Qos flows in the same PDU session may be mapped to DRBs in the MN and the SN respectively, that is, a split PDU session occurs. For example, a PDU session includes four Qos Flows, namely, Qos flow 1, Qos flow 2, Qos flow 3, and Qos flow 4, where Qos flow 1 and Qos flow 2 are mapped to DRBs in the MN, and Qos flow 3 and Qos flow 4 are mapped to DRBs in the SN. The protocol specifies that at most one default DRB can be configured for a PDU session, so how to configure a default DRB needs to be negotiated between the MN and the SN. Moreover, if a node does not have a default DRB, the node needs to ensure that each Qos flow is configured with a mapping rule between the Qos flow and a DRB. Therefore, to ensure the validity of bearer configuration, negotiation between the MN and the SN is required.

FIG. 3 is a first schematic flowchart of a bearer configuration method according to an embodiment of this application. As shown in FIG. 3, the bearer configuration method includes the following steps:

Step 301: A first node receives a first request message sent by a second node, the first request message carrying first indication information, and the first indication information being used for deciding, by the first node, whether to configure a default bearer, where the first node and the second node are a secondary node and a master node in a dual connectivity network respectively.

This embodiment of this application is applied to a dual connectivity scenario, where the dual connectivity network includes a master node and a secondary node. The master node and the secondary node may be of the same or different types. For example, the master node is an NR NodeB (gNB), and the secondary node is an LTE NodeB (eNB). For another example, both the master node and the secondary node are NR NodeBs (gNBs). In this embodiment of this application, the first node refers to a master node in a dual connectivity network, and the second node refers to a secondary node in the dual connectivity network.

In this embodiment of this application, the receiving, by a first node, a first request message sent by a second node may specifically be implemented in the following manners:

1) receiving, by the first node, a secondary node addition request message sent by the second node; or, 2) receiving, by the first node, a secondary node modification request message sent by the second node.

The secondary node addition request message or the secondary node modification request message carries first indication information, and the first indication information is used for deciding, by the first node, whether to configure a default bearer. Specifically, the first indication information is used for indicating at least one of the following:

1) whether the first node is allowed to configure the default bearer;

2) whether the first node needs to configure a mapping relationship between each data flow on the side of the first node and a bearer; and 3) whether the second node has configured the default bearer.

For example, the first indication information includes one-bit information, where the value of the one bit being 1 indicates that the first node is allowed to configure the default bearer, and the value of the one bit being 0 indicates that the first node is not allowed to configure the default bearer.

In one example, the first indication information includes one-bit information, where the value of the one bit being 1 indicates that the first node needs to configure a mapping relationship between each data flow at the first node and a bearer, and the value of the one bit being 0 indicates that the first node does not need to configure a mapping relationship between each data flow at the first node and a bearer.

In another example, the first indication information includes one-bit information, where the value of the one bit being 1 indicates that the second node has configured the default bearer, and the value of the one bit being 0 indicates that the second node has not configured the default bearer.

In the above solution, the content indicated by the first indication information may be any combination of the above. For example, the first indication information indicates that the first node is allowed to configure the default bearer and does not need to configure a mapping relationship between each data flow at the first node and a bearer, and the second node has not configured the default bearer. For another example, the first indication information indicates that the first node is not allowed to configure the default bearer and needs to configure a mapping relationship between each data flow at the first node and a bearer, and the second node has configured the default bearer.

Further, considering that at most one default bearer can be configured for each session, the first indication information correlates with a first session identifier, the first session identifier is used for identifying a first session, and the first indication information is specifically used for indicating at least one of the following:

1) Whether the first node is allowed to configure a default bearer corresponding to the first session.

2) Whether the first node needs to configure a mapping relationship between each data flow at the first node in the first session and a bearer.

3) Whether the second node has configured the default bearer corresponding to the first session.

In this embodiment of this application, the first indication information being used for deciding, by the first node, whether to configure a default bearer includes:

if the first indication information indicates that the first node is not allowed to configure the default bearer and/or the first node needs to configure a mapping relationship between each data flow at the first node and a bearer and/or the second node has configured the default bearer, the first node does not configure the default bearer; and if the first indication information indicates that the first node is allowed to configure the default bearer and/or the first node does not need to configure the mapping relationship between each data flow at the first node and the bearer and/or the second node has not configured the default bearer, the first node decides whether to configure the default bearer. In this case, the first node may decide to configure the default bearer, or decide not to configure the default bearer.

It should be noted that, in this embodiment of this application, the bearer refers to a DRB, the default bearer refers to a default DRB, the session refers to a PDU session, and the data flow refers to a Qos flow.

In specific implementation, the first node may configure the default DRB in the following manners: setting a default-DRB parameter to true in configuration information of service data adaptation protocol (SDAP) of the default DRB, and setting a defaultDRB parameter to false in configuration information of SDAP of other DRBs.

Optionally, the first node notifies the second node of whether the first node has configured the default bearer. In specific implementation, the first node sends first bearer configuration information to the second node, the first bearer configuration information carrying second indication information and/or configuration information of the default bearer, and the second indication information being used for indicating whether the first node has configured the default bearer. After the first bearer configuration information is received by the second node, the second node sends second bearer configuration information at the second node and the first bearer configuration information at the first node to a terminal.

In this embodiment of this application, if the first request message is the secondary node modification request message, the first indication information is further used for instructing the first node to add the default bearer or delete the default bearer. In this case, SRB3 is configured at the first node, and the first node can communicate with the terminal through SRB3. Specifically, if the first node determines to add the default bearer based on the first indication information, the first node sends, to the terminal, SRB3 used for configuring the default bearer; and if the first node determines to delete the default bearer based on the first indication information, the first node sends, to the terminal, SRB3 used for deconfiguring the default bearer.

FIG. 4 is a second schematic flowchart of a bearer configuration method according to an embodiment of this application. As shown in FIG. 4, the bearer configuration method includes the following steps:

Step 401: A second node sends a first request message to a first node, the first request message carrying first indication information, and the first indication information being used for deciding, by the first node, whether to configure a default bearer, where the first node and the second node are a secondary node and a master node in a dual connectivity network respectively.

This embodiment of this application is applied to a dual connectivity scenario, where the dual connectivity network includes a master node and a secondary node. The master node and the secondary node may be of the same or different types. For example, the master node is an NR NodeB (gNB), and the secondary node is an LTE NodeB (eNB). For another example, both the master node and the secondary node are NR NodeBs (gNBs). In this embodiment of this application, the first node refers to a master node in a dual connectivity network, and the second node refers to a secondary node in the dual connectivity network.

```
    SDAP-Config ::=              SEQUENCE {
        pdu-Session                 PDU-SessionID,
        sdap-HeaderDL               ENUMERATED {present, absent},
        sdap-HeaderUL               ENUMERATED {present, absent},
        defaultDRB                  BOOLEAN,
        mappedQoS-FlowsToAdd        SEQUENCE (SIZE (1..maxNrofQFIs))
OF QFI                                  OPTIONAL, -- Need N
        mappedQoS-FlowsToRelease    SEQUENCE (SIZE (1..maxNrofQFIs))
OF QFI                                  OPTIONAL, -- Need N
        ...
    }
```

Further, in the case that the first node does not configure the default bearer, the first node configures a mapping relationship between each data flow at the first node and a bearer. In this way, it can be ensured that each data flow at the first node can be mapped to a corresponding bearer.

In this embodiment of this application, the sending, by a second node, a first request message to a first node may specifically be implemented in the following manners:

1) sending, by the second node, a secondary node addition request message to the first node; or, 2) sending, by the second node, a secondary node modification request message to the first node.

The secondary node addition request message or the secondary node modification request message carries first indication information, and the first indication information is used for deciding, by the first node, whether to configure a default bearer. Specifically, the first indication information is used for indicating at least one of the following:

1) whether the first node is allowed to configure the default bearer;

2) whether the first node needs to configure a mapping relationship between each data flow at the first node and a bearer; and 3) whether the second node has configured the default bearer.

For example, the first indication information includes one-bit information, where the value of the one bit being 1 indicates that the first node is allowed to configure the default bearer, and the value of the one bit being 0 indicates that the first node is not allowed to configure the default bearer.

In one example, the first indication information includes one-bit information, where the value of the one bit being 1 indicates that the first node needs to configure a mapping relationship between each data flow at the first node and a bearer, and the value of the one bit being 0 indicates that the first node does not need to configure a mapping relationship between each data flow at the first node and a bearer.

In another example, the first indication information includes one-bit information, where the value of the one bit being 1 indicates that the second node has configured the default bearer, and the value of the one bit being 0 indicates that the second node has not configured the default bearer.

In the above solution, the content indicated by the first indication information may be any combination of the above. For example, the first indication information indicates that the first node is allowed to configure the default bearer and does not need to configure a mapping relationship between each data flow at the first node and a bearer, and the second node has not configured the default bearer. For another example, the first indication information indicates that the first node is not allowed to configure the default bearer and needs to configure a mapping relationship between each data flow at the first node and a bearer, and the second node has configured the default bearer.

Further, considering that at most one default bearer can be configured for each session, the first indication information correlates with a first session identifier, the first session identifier is used for identifying a first session, and the first indication information is specifically used for indicating at least one of the following:

1) Whether the first node is allowed to configure a default bearer corresponding to the first session.

2) Whether the first node needs to configure a mapping relationship between each data flow at the first node in the first session and a bearer.

3) Whether the second node has configured the default bearer corresponding to the first session.

Optionally, the second node receives the notification message sent by the first node, the notification message being used for notifying the second node of whether the first node has configured the default bearer. In specific implementation, the second node receives first bearer configuration information sent by the first node, the first bearer configuration information carrying second indication information and/or configuration information of the default bearer, and the second indication information being used for indicating whether the first node has configured the default bearer. After the first bearer configuration information is received by the second node, the second node sends second bearer configuration information at the second node and the first bearer configuration information at the first node to a terminal.

In this embodiment of this application, if the first request message is the secondary node modification request message, the first indication information is further used for instructing the first node to add the default bearer or delete the default bearer. In this case, SRB3 is configured at the first node, and the first node can communicate with the terminal through SRB3. Specifically, if the first node determines to add the default bearer based on the first indication information, the first node sends, to the terminal, SRB3 used for configuring the default bearer; and if the first node determines to delete the default bearer based on the first indication information, the first node sends, to the terminal, SRB3 used for deconfiguring the default bearer.

It should be noted that, in the above solution in this embodiment of this application, how to configure the default DRB is determined through negotiation between the master node and the secondary node. The technical solution in this embodiment of this application is not limited thereto. Whether the default DRB is configured at the master node or at the secondary node may also be specified in MR-DC configuration through a protocol, without negotiation between the master node and the secondary node.

FIG. 5 is a third schematic flowchart of a bearer configuration method according to an embodiment of this application. As shown in FIG. 5, the bearer configuration method includes the following steps:

Step 501: An MN decides to add a new SN node or modify configuration information of an SN node, and the MN sends a first request message to the SN, the first request message carrying first indication information.

In this case, the first request message may be a secondary node addition request (SN ADDITION REQUEST) message or a secondary node modification request (SN MODIFICATION REQUEST) message.

In this case, the first indication information may indicate at least one of the following:

1) The first indication information indicates whether the SN is allowed to configure a default DRB at the SN; further, the first indication information correlates with a PDU session identifier (PDU session id), and the first indication information indicates whether the SN is allowed to configure the default DRB for a specified PDU session (an identifier of the specified PDU session is a PDU session id correlating with the first indication information).

2) The first indication information indicates whether the SN needs to configure a mapping relationship between each data flow at the SN and a DRB; further, the first indication information correlates with a PDU session identifier (PDU session id), and the first indication information indicates whether the SN needs to configure a mapping relationship between each data flow at the SN and a DRB for a specified PDU session (an identifier of the specified PDU session is a PDU session id correlating with the first indication information).

3) The first indication information indicates whether the MN has configured a default DRB at the MN; further, the first indication information correlates with a PDU session identifier (PDU session id), and the first indication information indicates whether the MN has configured a default DRB for a specified PDU session (an identifier of the specified PDU session is a PDU session id correlating with the first indication information).

Step 502: After receiving the first request message, the SN decides, according to the first indication information in the first request message, whether to configure a default DRB.

In this case, if the first indication information indicates that the SN is not allowed to configure the default DRB and/or indicates that the SN needs to configure a mapping relationship between each Qos flow at the SN and a DRB and/or indicates that the MN has configured a default DRB, the SN does not configure the default DRB; further, the SN needs to ensure that a mapping relationship is configured between each Qos flow at the SN and a DRB. Otherwise, the SN itself decides whether to configure the default DRB, and the SN may choose to configure the default DRB or not to configure the default DRB.

Step 503: The SN sends bearer configuration information at the SN to the MN, and indicates, to the MN, whether the default DRB has been configured at the SN.

Step 504: The MN configures bearer configuration information on the sides of the MN and the SN for a UE.

FIG. 6 is a fourth schematic flowchart of a bearer configuration method according to an embodiment of this application. As shown in FIG. 6, the bearer configuration method includes the following steps:

Step 601: An MN decides to modify configuration information of an SN node, and the MN sends a secondary node modification request (SN MODIFICATION REQUEST) message to the SN, the secondary node modification request message carrying first indication information.

In this case, the first indication information may indicate at least one of the following:

1) The first indication information indicates whether the SN is allowed to configure a default DRB at the SN; further, the first indication information correlates with a PDU session identifier (PDU session id), and the first indication information indicates whether the SN is allowed to configure the default DRB for a specified PDU session (an identifier of the specified PDU session is a PDU session id correlating with the first indication information).

2) The first indication information indicates whether the SN needs to configure a mapping relationship between each data flow at the SN and a DRB; further, the first indication information correlates with a PDU session identifier (PDU session id), and the first indication information indicates whether the SN needs to configure a mapping relationship between each data flow at the SN and a DRB for a specified PDU session (an identifier of the specified PDU session is a PDU session id correlating with the first indication information).

3) The first indication information indicates whether the MN has configured a default DRB at the MN; further, the first indication information correlates with a PDU session identifier (PDU session id), and the first indication information indicates whether the MN has configured a default DRB for a specified PDU session (an identifier of the specified PDU session is a PDU session id correlating with the first indication information).

4) The first indication information instructs the SN to add the default DRB.

5) The first indication information instructs the SN to delete the default DRB.

Step 602: After receiving the first request message, the SN decides, according to the first indication information in the first request message, whether to add or delete a default DRB.

Step 603: The SN sends, to a UE, SRB3 used for configuring or deconfiguring the default DRB.

Optionally, if the SN has configured the default DRB, the SN sends a notification message to the MN, to notify the MN that the default DRB has been configured at the SN.

FIG. 7 is a first schematic diagram of structural composition of a bearer configuration apparatus according to an embodiment of this application. The apparatus is applied to a first node, and includes:

a receiving unit 701, configured to receive a first request message sent by a second node, the first request message carrying first indication information, and the first indication information being used for deciding, by the first node, whether to configure a default bearer, where the first node and the second node are a secondary node and a master node in a dual connectivity network respectively.

In an implementation, the first indication information is used for indicating at least one of the following:

whether the first node is allowed to configure the default bearer;

whether the first node needs to configure a mapping relationship between each data flow at the first node and a bearer; and whether the second node has configured the default bearer.

In an implementation, the first indication information correlates with a first session identifier, and the first session identifier is used for identifying a first session; and whether the first node is allowed to configure the default bearer includes whether the first node is allowed to configure a default bearer corresponding to the first session.

In an implementation, the first indication information correlates with a first session identifier, and the first session identifier is used for identifying a first session; and whether the first node needs to configure a mapping relationship between each data flow at the first node and a bearer includes whether the first node needs to configure a mapping relationship between each data flow at the first node in the first session and a bearer.

In an implementation, the first indication information correlates with a first session identifier, and the first session identifier is used for identifying a first session; and whether the second node has configured the default bearer includes whether the second node has configured a default bearer corresponding to the first session.

In an implementation, the apparatus further includes:

a configuration unit 702, configured to: if the first indication information indicates that the first node is not allowed to configure the default bearer and/or the first node needs to configure a mapping relationship between each data flow at the first node and a bearer and/or the second node has configured the default bearer, not configure the default bearer; and if the first indication information indicates that the first node is allowed to configure the default bearer and/or the first node does not need to configure a mapping relationship between each data flow at the first node and a bearer and/or the second node has not configured the default bearer, decide whether to configure the default bearer.

In an implementation, the configuration unit 702 is further configured to: in the case of not configuring the default bearer, configure a mapping relationship between each data flow at the first node and a bearer.

In an implementation, the apparatus further includes a first sending unit 703, configured to notify the second node of whether the first node has configured the default bearer.

In an implementation, the first sending unit 703 is configured to send first bearer configuration information to the second node, the first bearer configuration information carrying second indication information and/or configuration information of the default bearer, and the second indication information being used for indicating whether the first node has configured the default bearer.

In an implementation, the first request message is a secondary node addition request message or a secondary node modification request message.

In an implementation, if the first request message is the secondary node modification request message, the first indication information is further used for instructing the first node to add the default bearer or delete the default bearer. The apparatus further includes a second sending unit 704, configured to: if the first node determines to add the default bearer based on the first indication information, send, to a terminal, SRB3 used for configuring the default bearer; and if the first node determines to delete the default bearer based on the first indication information, send, to the terminal, SRB3 used for deconfiguring the default bearer.

It should be appreciated by a person skilled in the art that, related descriptions of the foregoing bearer configuration apparatus in the embodiments of this application may be understood by referring to related descriptions of the bearer configuration method in the embodiments of this application.

Figure 8:
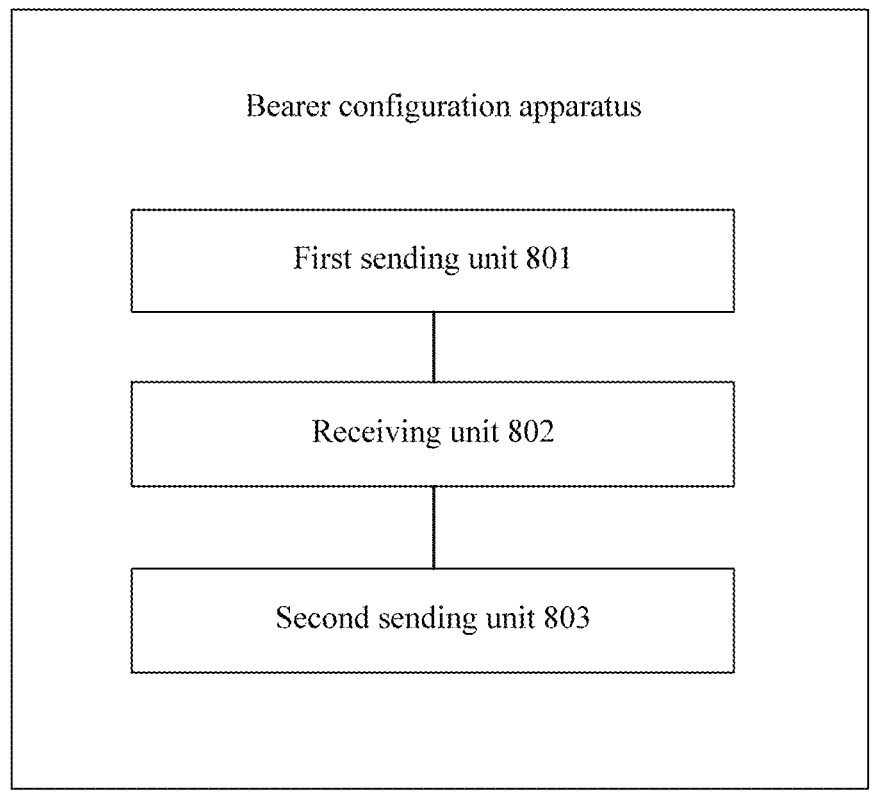
FIG. 8 is a second schematic diagram of structural composition of a bearer configuration apparatus according to an embodiment of this application.

FIG. 8 is a second schematic diagram of a structural composition of a bearer configuration apparatus according to an embodiment of this application. The apparatus is applied to a second node, and includes a first sending unit 801, configured to send a first request message to a first node, the first request message carrying first indication information, and the first indication information being used for deciding, by the first node, whether to configure a default bearer, where the first node and the second node are a secondary node and a master node in a dual connectivity network respectively.

In an implementation, the first indication information is used for indicating at least one of the following:

whether the first node is allowed to configure the default bearer;

whether the first node needs to configure a mapping relationship between each data flow at the first node and a bearer; and whether the second node has configured the default bearer.

In an implementation, the first indication information correlates with a first session identifier, and the first session identifier is used for identifying a first session; and whether the first node is allowed to configure the default bearer includes whether the first node is allowed to configure a default bearer corresponding to the first session.

In an implementation, the first indication information correlates with a first session identifier, and the first session identifier is used for identifying a first session; and whether the first node needs to configure a mapping relationship between each data flow at the first node and a bearer includes whether the first node needs to configure a mapping relationship between each data flow at the first node in the first session and a bearer.

In an implementation, the first indication information correlates with a first session identifier, and the first session identifier is used for identifying a first session; and whether the second node has configured the default bearer includes whether the second node has configured a default bearer corresponding to the first session.

In an implementation, the apparatus further includes a receiving unit 802, configured to receive a notification message sent by the first node, the notification message being used for notifying the second node of whether the first node has configured the default bearer.

In an implementation, the receiving unit 802 is configured to receive first bearer configuration information sent by the first node, the first bearer configuration information carrying second indication information and/or configuration information of the default bearer, and the second indication information being used for indicating whether the first node has configured the default bearer.

In an implementation, the apparatus further includes a second sending unit 803, configured to send second bearer configuration information at the second node and the first bearer configuration information at the first node to a terminal.

In an implementation, the first request message is a secondary node addition request message or a secondary node modification request message.

In an implementation, if the first request message is the secondary node modification request message, the first indication information is further used for instructing the first node to add the default bearer or delete the default bearer.

It should be appreciated by a person skilled in the art that, related descriptions of the foregoing bearer configuration apparatus in the embodiments of this application may be understood by referring to related descriptions of the bearer configuration method in the embodiments of this application.

Figure 9:
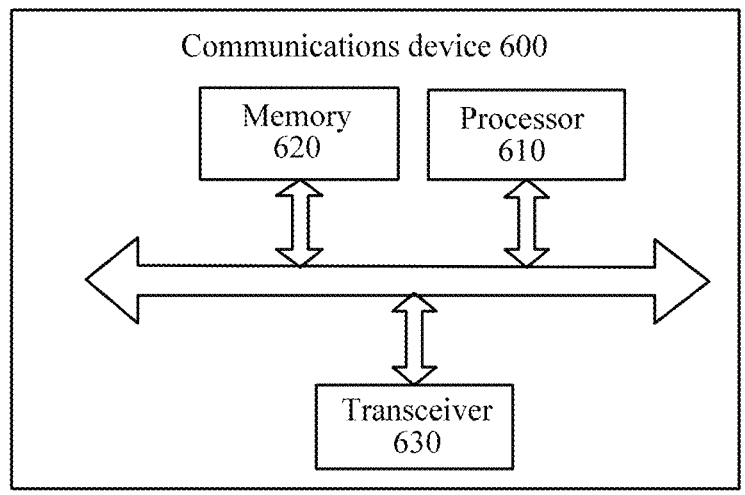
FIG. 9 is a schematic structural diagram of a communications device according to an embodiment of this application.

FIG. 9 is a schematic structural diagram of a communications device 600 according to an embodiment of this application. The communications device may be a network device, for example, a master node or a secondary node in a dual connectivity network. The communications device 600 shown in FIG. 9 includes a processor 610. The processor 610 may invoke a computer program from a memory and run the computer program, to implement the method in the embodiments of this application.

Optionally, as shown in FIG. 9, the communications device 600 may further include a memory 620. The processor 610 may invoke the computer program from the memory 620 and run the computer program, to implement the method in the embodiments of this application.

The memory 620 may be a component independent of the processor 610, or may be integrated into the processor 610.

Optionally, as shown in FIG. 9, the communications device 600 may further include a transceiver 630, and the processor 610 may control the transceiver 630 to communicate with other devices, to be specific, send information or data to other devices, or receive information or data sent by other devices.

The transceiver 630 may include a transmitter and a receiver. The transceiver 630 may further include an antenna, where one or more antennas may be provided.

Optionally, the communications device 600 may specifically be the network device in the embodiments of this application, and the communications device 600 can implement corresponding procedures implemented by the network device in various methods in the embodiments of this application. For brevity, details are not described herein again.

Optionally, the communications device 600 may specifically be the mobile terminal/terminal in the embodiments of this application, and the communications device 600 can implement corresponding procedures implemented by the mobile terminal/terminal in various methods in the embodiments of this application. For brevity, details are not described herein again.

Figure 10:
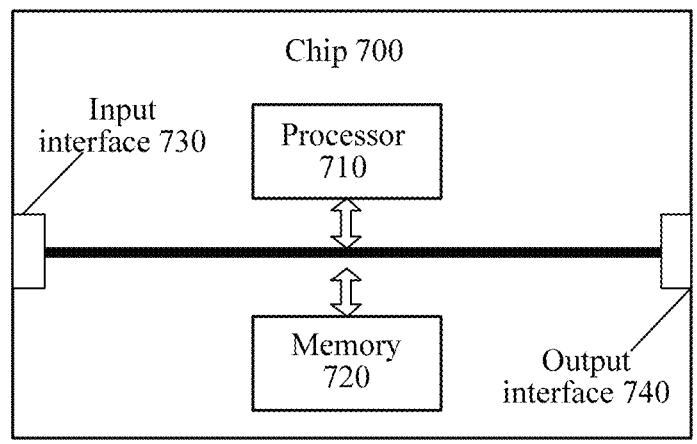
FIG. 10 is a schematic structural diagram of a chip according to an embodiment of this application.

FIG. 10 is a schematic structural diagram of a chip according to an embodiment of this application. The chip 700 shown in FIG. 10 includes a processor 710. The processor 710 may invoke a computer program from a memory and run the computer program, to implement the method in the embodiments of this application.

Optionally, as shown in FIG. 10, the chip 700 may further include a memory 720. The processor 710 may invoke the computer program from the memory 720 and run the computer program, to implement the method in the embodiments of this application.

The memory 720 may be a component independent of the processor 710, or may be integrated into the processor 710.

Optionally, the chip 700 may further include an input interface 730. The processor 710 may control the input interface 730 to communicate with another device or chip, and specifically, may obtain information or data sent by another device or chip.

Optionally, the chip 700 may further include an output interface 740. The processor 710 may control the output interface 740 to communicate with another device or chip, and specifically, may output information or data to another device or chip.

Optionally, the chip may be applied to the network device in the embodiments of this application, and the chip can implement corresponding procedures implemented by the network device in various methods in the embodiments of this application. For brevity, details are not described herein again.

Optionally, the chip may be applied to the mobile terminal/terminal in the embodiments of this application, and the chip can implement corresponding procedures implemented by the mobile terminal/terminal in various methods in the embodiments of this application. For brevity, details are not described herein again.

It should be noted that, the chip mentioned in the embodiments of this application may also be referred to as a system-level chip, a system chip, a chip system, a system on chip, or the like.

Figure 11:
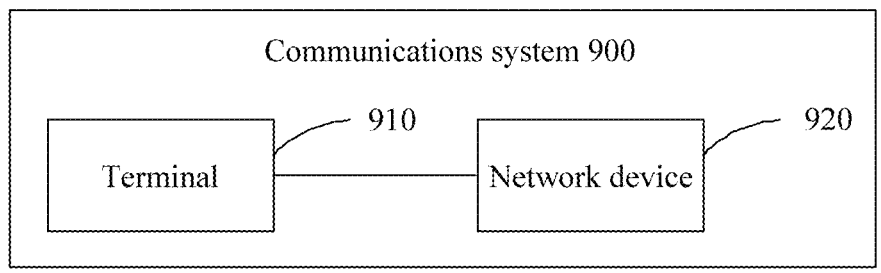
FIG. 11 is a schematic block diagram of a communications system according to an embodiment of this application.

FIG. 11 is a schematic block diagram of a communications system 900 according to an embodiment of this application. As shown in FIG. 11, the communications system 900 includes a terminal 910 and a network device 920.

The terminal 910 may be configured to implement the corresponding functions implemented by the terminal in the above method, and the network device 920 may be configured to implement the corresponding functions implemented by the network device in the above method. For brevity, details are not described herein again.

It should be understood that, the processor of this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform methods, steps and logical block diagrams disclosed in the embodiments of this application. The general purpose processor may be a microprocessor or the processor may be any conventional processor or the like. Steps of the methods disclosed with reference to the embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory, and completes the steps of the foregoing methods in combination with hardware of the processor.

It may be understood that the memory in the embodiments of this application may be a volatile memory or a nonvolatile memory, or may include a volatile memory and a nonvolatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM). It should be noted that the storage of the system and the method described in this specification aims to include, but is not limited to, these and any other suitable type of memory.

It should be understood that, the memory is an example but is not intended for limitation. For example, the memory in the embodiments of this application may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory in this embodiment of this application aims to include but is not limited to these memories and any other suitable type of memory.

An embodiment of this application further provides a computer readable storage medium, configured to store a computer program.

Optionally, the computer-readable storage medium may be applied to the network device in the embodiments of this application, and the computer program causes a computer to implement corresponding procedures implemented by the network device in various methods in the embodiments of this application. For brevity, details are not described herein again.

Optionally, the computer-readable storage medium may be applied to the mobile terminal/terminal in the embodiments of this application, and the computer program causes a computer to implement corresponding procedures implemented by the mobile terminal/terminal in various methods in the embodiments of this application. For brevity, details are not described herein again.

An embodiment of this application further provides a computer program product, including a computer program instruction.

Optionally, the computer program product may be applied to the network device in the embodiments of this application, and the computer program instruction causes a computer to implement corresponding procedures implemented by the network device in various methods in the embodiments of this application. For brevity, details are not described herein again.

Optionally, the computer program product may be applied to the mobile terminal/terminal in the embodiments of this application, and the computer program instruction causes a computer to implement corresponding procedures implemented by the mobile terminal/terminal in various methods in the embodiments of this application. For brevity, details are not described herein again.

An embodiment of this application further provides a computer program.

Optionally, the computer program may be applied to the network device in the embodiments of this application, and the computer program, when run in a computer, causes the computer to implement corresponding procedures implemented by the network device in various methods in the embodiments of this application. For brevity, details are not described herein again.

Optionally, the computer program may be applied to the mobile terminal/terminal in the embodiments of this application, and the computer program, when run in a computer, causes the computer to implement corresponding procedures implemented by the mobile terminal/terminal in various methods in the embodiments of this application. For brevity, details are not described herein again.

A person of ordinary skill in the art may notice that the exemplary units and algorithm steps described with reference to the embodiments disclosed in this specification can be implemented in electronic hardware, or a combination of computer software and electronic hardware. Whether these functions are executed in the manner of hardware or software depends on specific applications and design constraints of the technical solutions. A person skilled in the art may use different methods to implement the described functions for each particular application, but it should not be considered that the implementation goes beyond the scope of this application.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and there may be other divisions during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

If implemented in the form of software functional units and sold or used as an independent product, the functions may also be stored in a computer-readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash disk, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for bearer configuration in a dual connectivity network, comprising:
receiving, by a first node, a first request message from a second node, the first request message carrying first indication information, wherein the first indication information includes one-bit information, and wherein the first indication information is indicative of one or more of the following:
(1) whether the first node is allowed to configure a default bearer,
(2) whether the first node is to configure a mapping relationship between each data flow at the first node and a bearer, and
(3) whether the second node has configured the default bearer; and
determining, by the first node, whether to configure the default bearer based on the one-bit information, wherein the first node is a secondary node and wherein the second node is a master node,
wherein if the first indication information indicates that (i) the first node is not allowed to configure the default bearer, (ii) the first node is to configure the mapping relationship between each data flow at the first node and the bearer, and/or (iii) the second node has configured the default bearer, the first node is not to configure the default bearer,
wherein if the first indication information indicates that (i) the first node is allowed to configure the default bearer, (ii) the first node is not to configure the mapping relationship between each data flow at the first node and the bearer, and/or (iii) the second node has not configured the default bearer, the first node decides whether to configure the default bearer, and
wherein a value of the one bit information being 1 indicates that the first node is allowed to configure the default bearer, and the value of the one bit information being 0 indicates that the first node is not allowed to configure the default bearer.

2. The method according to claim 1, wherein:
the first indication information corresponds to a first session identifier for identifying a first session; and
the first indication information is indicative of that whether the first node is allowed to configure the default bearer corresponding to the first session.

3. The method according to claim 1, wherein:
the first indication information corresponds to a first session identifier for identifying a first session; and
the first indication information is indicative that whether the first node is to configure the mapping relationship between each data flow at the first node in the first session and the bearer.

4. The method according to claim 1, wherein:
the first indication information corresponds to a first session identifier for identifying a first session; and
the first indication information is indicative that whether the second node has configured the default bearer corresponding to the first session.

5. The method according to claim 1, wherein the first indication information corresponds to a first session identifier for identifying a packet data unit (PDU) session.

6. The method according to claim 1, further comprising:
notifying, by the first node, the second node of whether the first node has configured the default bearer.

7. The method according to claim 1, further comprising:
sending, by the first node, first bearer configuration information to the second node, the first bearer configuration information carrying second indication information and/or configuration information of the default bearer, wherein the second indication information is indicative of whether the first node has configured the default bearer.

8. The method according to claim 7, further comprising:
after receiving the first bearer configuration information, sending, by the second node, second bearer configuration information at the second node and the first bearer configuration information to a terminal.

9. The method according to claim 1, wherein the first request message is a secondary node addition request message or a secondary node modification request message.

10. The method according to claim 1, wherein the first request message is a secondary node modification request message, and wherein the method comprises instructing the first node to add the default bearer or delete the default bearer based on the indication information in the secondary node modification request message.

11. The method according to claim 10, further comprising:
if the first node determines to add the default bearer based on the first indication information, sending, by the first node to a terminal, a signaling radio bearer 3 (SRB3) for configuring the default bearer.

12. The method according to claim 10, further comprising: if the first node determines to delete the default bearer based on the first indication information, sending, by the first node to a terminal, a signaling radio bearer 3 (SRB3) for deconfiguring the default bearer.

13. A method for bearer configuration in a dual connectivity network, comprising:
sending, by a second node, a first request message to a first node, the first request message carrying first indication information, wherein the first indication information includes one-bit information, and wherein the first indication information is indicative of one or more of the following:
(1) whether the first node is allowed to configure a default bearer,
(2) whether the first node is to configure a mapping relationship between each data flow at the first node and a bearer, and
(3) whether the second node has configured the default bearer; and wherein the first node is a secondary node and the second node is a master node,
wherein if the first indication information indicates that (i) the first node is not allowed to configure the default bearer, (ii) the first node is to configure the mapping relationship between each data flow at the first node and the bearer, and/or (iii) the second node has configured the default bearer, the first node is not to configure the default bearer,
wherein if the first indication information indicates that (i) the first node is allowed to configure the default bearer, (ii) the first node is not to configure the mapping relationship between each data flow at the first node and a bearer, and/or (iii) the second node has not configured the default bearer, the first node decides whether to configure the default bearer, and
wherein a value of the one bit information being 1 indicates that the first node is allowed to configure the default bearer, and the value of the one bit information being 0 indicates that the first node is not allowed to configure the default bearer.

14. The method according to claim 13, wherein:
the first indication information corresponds to a first session identifier for identifying a first session; and
the first indication information is indicative that whether the first node is allowed to configure the default bearer corresponding to the first session.

15. The method according to claim 13, wherein:
the first indication information corresponds to a first session identifier for identifying a first session; and
the first indication information is indicative that whether the first node is to configure a mapping relationship between each data flow at the first node in the first session and a bearer.

16. The method according to claim 13, wherein
the first indication information corresponds to a first session identifier for identifying a first session; and
the first indication information is indicative that whether the second node has configured the default bearer corresponding to the first session.

17. The method according to claim 13, further comprising:
receiving, by the second node, a notification message from the first node for notifying the second node of whether the first node has configured the default bearer.

18. The method according to claim 13, wherein the first request message is a secondary node addition request message or a secondary node modification request message.

19. The method according to claim 13, wherein if the first request message is a secondary node modification request message, and wherein the method comprises instructing the first node to add the default bearer or delete the default bearer based on the secondary node modification request message.

20. The method according to claim 13, wherein the first indication information corresponds to a first session identifier for identifying a packet data unit (PDU) session.

21. An apparatus for bearer configuration for a first node in a dual connectivity network, comprising:
a receiving unit, configured to receive a first request message from a second node, the first request message carrying first indication information, wherein the first indication information includes one-bit information, wherein the first indication information is indicative of one or more of the following:
(1) whether the first node is allowed to configure a default bearer, (2) whether the first node is to configure a mapping relationship between each data flow at the first node and a bearer, and (3) whether the second node has configured the default bearer;

wherein the first node is a secondary node, and wherein the second node is a master node, wherein if the first indication information indicates that (i) the first node is not allowed to configure the default bearer, (ii) the first node is to configure the mapping relationship between each data flow at the first node and the bearer, and/or (iii) the second node has configured the default bearer, the first node is not to configure the default bearer, wherein if the first indication information indicates that (i) the first node is allowed to configure the default bearer, (ii) the first node is not to configure the mapping relationship between each data flow at the first node and a bearer, and/or (iii) the second node has not configured the default bearer, the first node decides whether to configure the default bearer, and wherein a value of the one bit information being 1 indicates that the first node is allowed to configure the default bearer, and the value of the one bit information being 0 indicates that the first node is not allowed to configure the default bearer.

22. The apparatus according to claim 21, wherein:

the first indication information corresponds to a first session identifier for identifying a first session; and the first indication information is indicative that whether the first node is allowed to configure the default bearer corresponding to the first session.

23. The apparatus according to claim 21, wherein the first indication information corresponds to a first session identifier for identifying a first session; and the first indication information is indicative that whether the first node is to configure a mapping relationship between each data flow at the first node in the first session and a bearer.

24. The apparatus according to claim 21, wherein:

the first indication information corresponds to a first session identifier for identifying a first session; and the first indication information is indicative that whether the second node has configured the default bearer corresponding to the first session.

25. A network device, comprising a processor; and a memory configured to store a computer program, wherein the processor is configured to run the computer program stored in the memory, to:

transmit a first request message to a first node from a second node, the first request message carrying first indication information, wherein the first indication information includes one-bit information, and wherein the first indication information is indicative of one or more of the following:

(1) whether the first node is allowed to configure a default bearer, (2) whether the first node is to configure a mapping relationship between each data flow at the first node and a bearer, and (3) whether the second node has configured the default bearer; and determine whether to configure a default bearer based on the one-bit information, wherein the second node is a master node, and wherein the first node is a secondary node, wherein if the first indication information indicates that (i) the first node is not allowed to configure the default bearer, (ii) the first node is to configure the mapping relationship between each data flow at the first node and the bearer, and/or (iii) the second node has configured the default bearer, the first node is not to configure the default bearer, wherein if the first indication information indicates that (i) the first node is allowed to configure the default bearer, (ii) the first node is not to configure the mapping relationship between each data flow at the first node and a bearer, and/or (iii) the second node has not configured the default bearer, the first node decides whether to configure the default bearer, and wherein a value of the one bit information being 1 indicates that the first node is allowed to configure the default bearer, and the value of the one bit information being 0 indicates that the first node is not allowed to configure the default bearer.

* * * * *